United States Patent [19]

Burnet

[11] Patent Number: 5,013,054
[45] Date of Patent: May 7, 1991

[54] BUSH MOUNTING FOR A FLOATING CHUCK

[75] Inventor: Jacques Burnet, Saint-Priest, France

[73] Assignee: SMP2 SA, Bron, France

[21] Appl. No.: 434,290

[22] Filed: Nov. 13, 1989

[30] Foreign Application Priority Data

Nov. 14, 1988 [FR] France ................... 88 15181

[51] Int. Cl.⁵ .............................................. B23B 31/02
[52] U.S. Cl. ...................................... 279/16; 384/614; 384/624
[58] Field of Search ................. 279/16, 1 L; 384/126, 384/127, 614, 624

[56] References Cited

U.S. PATENT DOCUMENTS

| | | | |
|---|---|---|---|
| 2,042,648 | 6/1936 | Ziegler | 279/16 |
| 2,373,860 | 4/1945 | Torresen | 384/127 X |
| 3,072,417 | 3/1961 | Ziegler | 279/16 |
| 3,077,352 | 3/1961 | Van Straaten | 279/16 |

FOREIGN PATENT DOCUMENTS

| | | |
|---|---|---|
| 1261731 | 6/1968 | Fed. Rep. of Germany . |
| 2236110 | 4/1973 | Fed. Rep. of Germany . |
| 2471276 | 6/1981 | France . |

*Primary Examiner*—Steven C. Bishop
*Attorney, Agent, or Firm*—Oliff & Berridge

[57] ABSTRACT

A floating chuck having a bush movably mounted on a body is disclosed. The chuck includes a plate having four holes staggered pairwise 90 degrees apart in the periphery of the plate and serving to accommodate four axial fingers, two of the fingers being 180 degrees apart and integral with the body, and the other two fingers being integral with the bush. Each hole has a depth greater than the diameter of the fingers, to allow displacement of the plate in two intersecting directions.

The plate includes openings which are regularly distributed and serve to accommodate bearings. The bearings abut two opposed bearing surfaces, one located on the body and other on the bush. The difference between the diameter of bearings and the thickness of the plate is less than the elastic deformation limit value of bearings and the bearing surfaces.

1 Claim, 2 Drawing Sheets

BUSH MOUNTING FOR A FLOATING CHUCK

FIELD OF THE INVENTION

The present invention concerns machine tools and specifically an arrangement for mounting a bush on the body of a floating chuck.

BACKGROUND OF THE INVENTION

In certain machine tools, such as semiautomatic lathes, center lathes, or drill presses, despite the precision of the machines, it is difficult to perfectly align the axis of the element supporting the boring tool with the axis of the bore to be produced. One of the main causes of these problems is the temperature variations caused by heating, which take the form of uncontrollable expansion phenomena.

To ensure good alignment between the boring tool and the bore, it is known that a floating chuck can be used which automatically and geometrically compensates for errors in alignment and angularity.

In known fashion, the tool-carrying bush is coupled to the chuck by an Oldham coupling and moves on spherical bearings associated with this coupling. Thus, the chuck can shift laterally relative to the body, while maintaining perfect parallelism with the axis of the chuck.

The Oldham coupling comprises a plate which has four openings, shifted angularly pairwise by 90 degrees, in its periphery, said openings serving to accommodate four axial fingers, two of said fingers, 180 degrees apart, being integral with the body, and the other two fingers being integral with the bush, each opening having a depth greater than the diameter of the fingers so as to allow the plate to shift in two crosswise directions. In one of these directions, the bush shifts with the plate relative to the body, while in the other crosswise direction the body shifts with the plate relative to the bush. The plate has openings to accommodate spherical bearings which abut the two parallel surfaces located on both parts of the plate and which are integral respectively with the body and the bush.

This solution is satisfactory in the sense that it allows extremely fine and delicate adjustment of the lateral position of the bush relative to the plate. However, the spherical bearings are only in point contact with the plates, so that the latter must be made of a highly resistant material, and the axial load-carrying capacity of the bush is relatively low because of the excessively high pressures exerted by the spherical bearings on the contact surfaces, resulting in marring of the latter.

The deterioration caused by axial overloading becomes generally evident in the event of abnormal functioning caused by impact, tool breakage, improper operation, or other events.

This axial overload corresponds to an increase in relative pressure between the spherical bearings and the surfaces of the body and the bush between which the bearings roll resulting in destruction of these elements. In such cases, the bush must be replaced.

The spherical bearings and their bearing surfaces have a reversible elastic deformation capability up to a certain degree of deformation. Beyond this value, deformation becomes permanent and the bush is damaged.

SUMMARY OF THE INVENTION

The object of the present invention is to overcome these disadvantages by providing a floating chuck equipped with means to prevent its deterioration when the axial load is increased.

To this end, the device for mounting a bush in the body of a floating chuck to which it relates, of the type described above, is characterized by the difference between the diameter of the spherical bearings and the thickness of the plate being less than or equal to the total limiting value of the elastic deformation of the spherical bearings and of the bearing surfaces of the body and the bush respectively, against which the bearing abuts.

In this manner, the total deformation of the spherical bearings and their contact surfaces is limited to a value which is equal to the difference between the diameter of the bearings and the thickness of the plate, said value itself being less than the limit of elastic deformation of the elements. Thus, when the axial load on the chuck increases, deformation is limited by the contact of the two faces of the plate with the opposite surfaces against which the bearings abut. The limit of elastic deformation of the elements is not reached and the chuck cannot be damaged.

In any event, the invention will be better understood from the following description which refers to the attached schematic diagram as a nonlimiting example of one embodiment of this floating chuck:

DESCRIPTION OF THE PREFERRED EMBODIMENT

Figure 1:
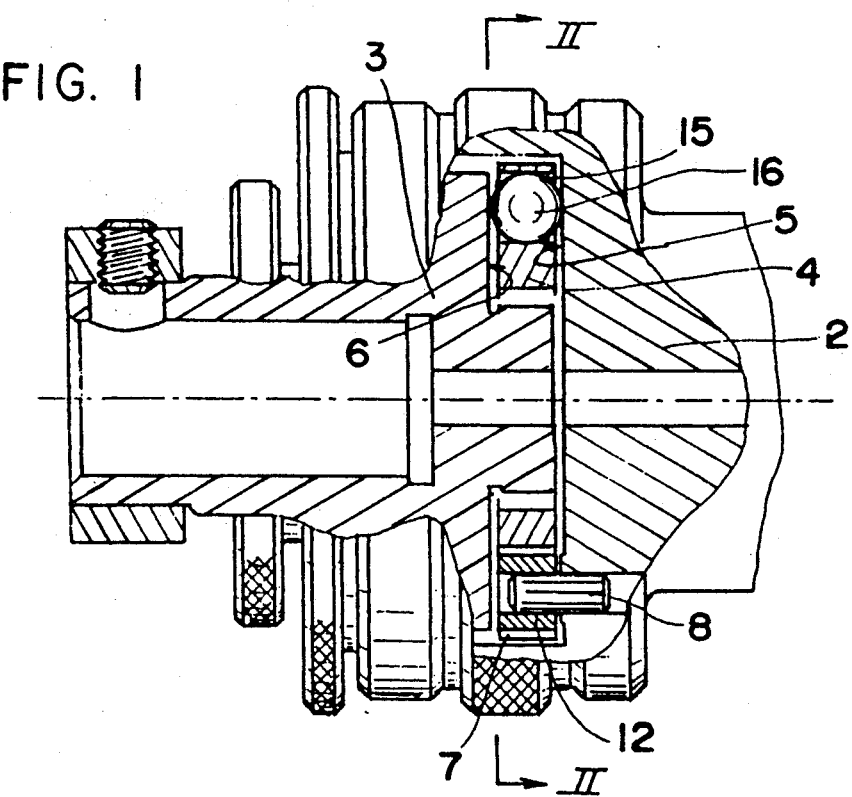
FIG. 1 is a partial side view in lengthwise section along line I—I in FIG. 2.
Figure 2:
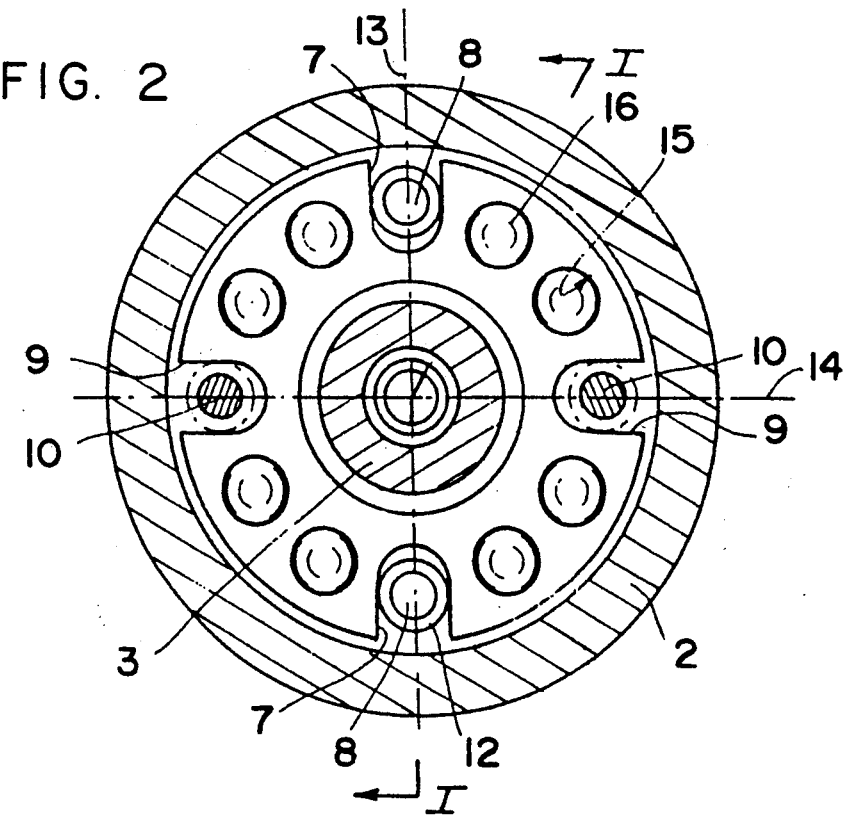
FIG. 2 is a cross section along line II—II in FIG. 1.
Figure 3:
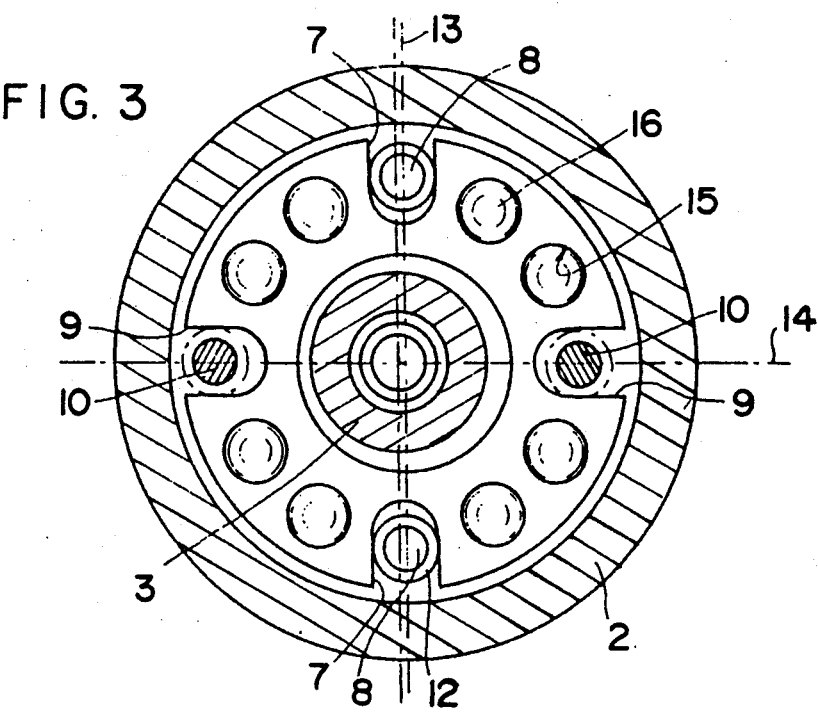
FIGS. 3 and 4 are two cross sectional views similar to FIG. 2 in two positions involving misalignment.
Figure 4:
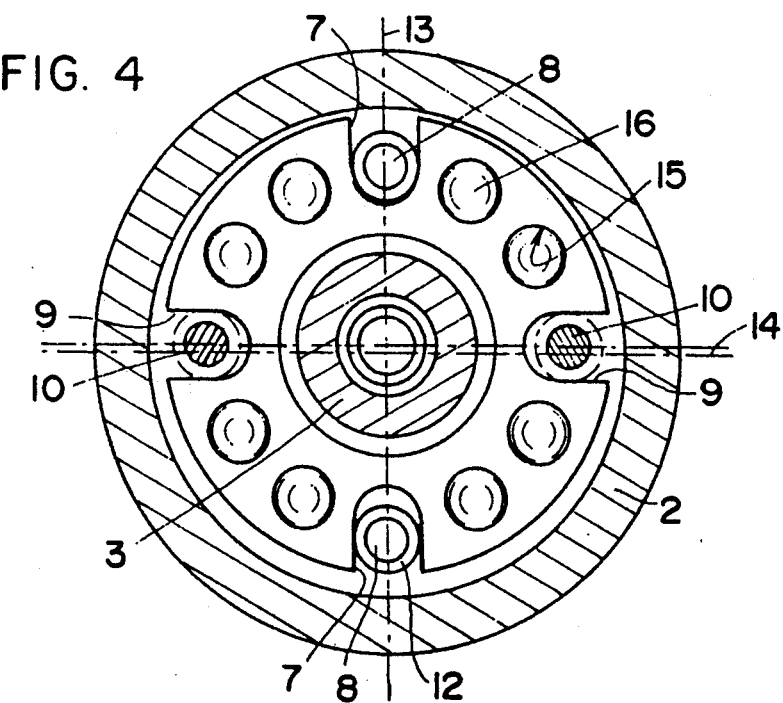

The floating chuck shown in FIG. 1 comprises a body 2 provided in known fashion with means of attachment, not shown, to a machine tool, and a bush 3 designed to hold the tool. The mounting of the bush on the body is accomplished by means of an Oldham coupling comprising a plate 4 mounted between two surfaces 5 and 6 of the body and the bush, respectively. Plate 4 has four openings terminating at its periphery, said openings being located 90 degrees apart. Two fingers 8 integral with the body are engaged in two diametrally opposite holes 7, while two fingers 10 integral with the bush are engaged in the two other openings 9.

These fingers 8 and 10 are surrounded by rollers 12, which facilitate the shifting of the fingers in holes 7 and 9, said holes being for this purpose of a depth greater than the diameter of the fingers. In view of this assembly, plate 4 and bush 3 can shift relative to the body in the direction of axis 13, while plate 4 and body 2 can shift together relative to bush 3 in a direction which is crosswise and corresponds to displacement along axis 14.

Plate 4 comprises openings 15, numbering eight in the embodiment shown in the drawing, each opening being designed to accommodate a spherical bearing 16 designed to abut surfaces 5 and 6 of body 2 and bushing 3, respectively.

Figure 5:
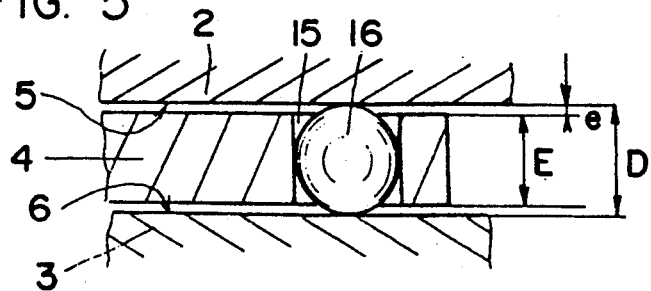
FIG. 5 is a partial view, in cross section and on an enlarged scale, of a bearing and an intermediate plate between the body and the bush.

FIG. 5 shows a detail of the mounting of a ball 16 and a plate 4 forming a cage, between body 2 and bush 3. The diameter of the bearing is indicated by reference D and the thickness of plate 4 by reference E, E being smaller than D with a value equal to 2e. The difference between diameter D of bearings 16 and thickness E of plate 4 is less than or equal to the total value of the elastic deformation of bearings 16 and surfaces 5, 6 of body 2 and bush 3, against which the bearings abut. For example, if the diameter D of the bearings is 8.50 mm and the elastic deformation limit value is 0.07 mm, the thickness E of the plate can be selected to have a value of 8.45 mm, so as to limit play when the axial load on the chuck increases to 0.05 mm. In other words, when the chuck is subjected to a high axial load, the bearings and opposite surfaces 5, 6 are deformed within a limit of 0.05 mm. This limit is determined by the contact of the two surfaces of plate 4 with faces 5 and 6 of the body and the bush. This deformation being less than the elastic deformation limit value, which is 0.07 mm, the chuck is not damaged.

The functioning of this floating chuck is the same as that of known chucks, with the relative movements being performed in two directions corresponding to the orientations of lines 13 and 14. These movements are facilitated by the rolling of the eight bearings.

As follows from the above, the invention represents a considerable improvement in the existing technology by providing a device with a simple design which perfectly performs the desired functions well and has considerable reliability.

Of course, the invention is not limited to the sole embodiment of this chuck described above as an example. It is possible for the values for the diameter of bearings 16 and for the thickness of plate 4 to be different without departing from the scope of the invention.

What is claimed is:

1. A floating chuck comprising:
   a body,
   a bush movable mounted with respect to the body,
   a plate located between the bush and the body,
   four openings formed 90 degrees apart in the periphery of the plate,
   a pair of fingers mounted on the body, spaced arcuately apart by 180 degrees and each being receiving in one of an opposed pair of the openings in the plate,
   a pair of fingers mounted on the bush, spaced arcuated apart by 180 degrees and each being received in one of another pair of opposed openings in the plate,
   a plurality of bearing openings extending through the plate,
   a spherical bearing member disposed in each bearing opening and in mutual abutting relationship with opposed bearing surfaces on the body and the bush, the bearing members having a diameter greater than the thickness of the plate and the difference between the diameter of the spherical bearings and the thickness of the plate being less than or equal to the total limiting value of the elastic deformation of a spherical bearing member and the bearing surfaces of the bush and the body.

* * * * *